United States Patent
Aso et al.

(10) Patent No.: US 9,435,238 B2
(45) Date of Patent: Sep. 6, 2016

(54) EXHAUST PURIFICATION DEVICE FOR INTERNAL COMBUSTION ENGINE

(71) Applicant: ISUZU MOTORS LIMITED, Tokyo (JP)

(72) Inventors: Mitsuhiro Aso, Yokohama (JP); Tadashi Uchiyama, Kamakura (JP); Masafumi Noda, Kawasaki (JP)

(73) Assignee: ISUZU MOTORS LIMITED, Tokyo (JO)

( * ) Notice: Subject to any disclaimer, the term of this patent is extended or adjusted under 35 U.S.C. 154(b) by 0 days.

(21) Appl. No.: 14/763,723

(22) PCT Filed: Jan. 15, 2014

(86) PCT No.: PCT/JP2014/050566
§ 371 (c)(1),
(2) Date: Oct. 16, 2015

(87) PCT Pub. No.: WO2014/115622
PCT Pub. Date: Jul. 31, 2014

(65) Prior Publication Data
US 2016/0040571 A1 Feb. 11, 2016

(30) Foreign Application Priority Data
Jan. 28, 2013 (JP) .................... 2013-013390

(51) Int. Cl.
*F01N 3/025* (2006.01)
*F01N 3/027* (2006.01)
(Continued)

(52) U.S. Cl.
CPC ............ *F01N 3/0253* (2013.01); *F01N 3/027* (2013.01); *F01N 3/0892* (2013.01); *F01N 9/002* (2013.01);
(Continued)

(58) Field of Classification Search
CPC .... F01N 3/027; F01N 9/002; F01N 2240/16; F01N 2560/12; F01N 2900/1606
See application file for complete search history.

(56) References Cited

U.S. PATENT DOCUMENTS

2009/0309571 A1   12/2009   Katsuyama et al.

FOREIGN PATENT DOCUMENTS

| JP | 2002-21537 | 1/2002 |
| JP | 4070687 | 3/2005 |

(Continued)

OTHER PUBLICATIONS

Machine translation of JP 2007-313443 A, accessed on Feb. 22, 2016.*

(Continued)

*Primary Examiner* — Jonathan Matthias
(74) *Attorney, Agent, or Firm* — Staas & Halsey LLP

(57) ABSTRACT

An exhaust gas purification device includes a diesel particulate filter (DPF) that traps particulate matter (PM), an exhaust gas temperature sensor that detects temperature of an exhaust gas, an electrostatic capacity detection unit that detects an electrostatic capacity of the DPF, an accumulated-amount estimation unit that estimates an amount of PM accumulated in the DPF on the basis of the electrostatic capacity, and a filter regeneration unit that can perform forced regeneration. On the basis of an accumulated-amount threshold that is lower than an upper PM accumulation limit, and a temperature threshold at which the accumulated PM can still be burned and removed even if an amount of fuel supply is reduced, the filter regeneration unit performs the forced regeneration if the amount of accumulated PM has reached the accumulated-amount threshold and the exhaust gas temperature reaches the temperature threshold.

4 Claims, 4 Drawing Sheets

(51) Int. Cl.
*F01N 9/00* (2006.01)
*F01N 3/08* (2006.01)
(52) U.S. Cl.
CPC ........ *F01N 2240/16* (2013.01); *F01N 2560/06* (2013.01); *F01N 2560/12* (2013.01); *F01N 2900/1606* (2013.01); *Y02T 10/47* (2013.01)

(56) References Cited

FOREIGN PATENT DOCUMENTS

| | | |
|---|---|---|
| JP | 2007-313443 | 12/2007 |
| JP | 2010-285958 | 12/2010 |
| JP | 2011-32969 | 2/2011 |
| WO | WO 2008/117853 A1 | 10/2008 |

OTHER PUBLICATIONS

Machine translation of JP 2011-032969 A, accessed on Feb. 22, 2016.*
Machine translation of JP 2010-285958 A, accessed on Feb. 22, 2016.*
Machine translation of JP 2002-021537 A, accessed on Feb. 22, 2016.*
PCT International Preliminary Report on Patentability issued Jul. 28, 2015 in corresponding International Patent Application No. PCT/JP2014/050566.
PCT Written Opinion of the International Searching Authority mailed Mar. 25, 2014 in corresponding International Patent Application No. PCT/ JP2014/050566.
Espacenet Bibliographic data, Publication No. 2007-313443, published Dec. 6, 2007.
Espacenet Bibliographic data, Publication No. 2011-32969, published Feb. 17, 2011.
Espacenet Bibliographic data, Publication No. 2010-285958, published Dec. 24, 2010.
Espacenet Bibliographic data, Publication No. 2002-21537, published Jan. 23, 2002.
Espacenet Bibliographic data, Publication No. WO 2008/117853 A1, published Oct. 2, 2008.
Espacenet Bibliographic data, Publication No. 2005-61296, published Mar. 10, 2005 (corresponding to AG).
International Search Report mailed Mar. 25, 2014, in corresponding International Application No. PCT/JP2014/050566.

* cited by examiner exhaust gas purification device according to an embodiment of the present invention.

EXHAUST PURIFICATION DEVICE FOR INTERNAL COMBUSTION ENGINE

CROSS-REFERENCE TO RELATED APPLICATIONS

This application is a U.S. National Stage Application, which claims the benefit under 35 U.S.C. §371 of PCT International Patent Application No. PCT/JP2014/050566, filed Jan. 15, 2014, which claims the foreign priority benefit under 35 U.S.C. §119 of Japanese Patent Application No. 2013-013390, filed Jan. 28, 2013, the contents of which are incorporated herein by reference.

TECHNICAL FIELD

The present invention relates to exhaust purification devices for internal combustion engines, and in particular relates to an exhaust purification device that has a filter for collecting particulate matter in an exhaust gas emitted from an internal combustion engine.

BACKGROUND ART

A diesel particulate filter (hereinafter, referred to as DPF), for example, is known as a filter for collecting particulate matter (hereinafter, referred to as PM) in an exhaust gas emitted from a diesel engine.

The DPF can only collect a limited amount of PM, and therefore a forced regeneration needs to be performed to periodically burn and remove accumulated PM. The forced regeneration is performed by supplying unburned fuel, (primarily hydrocarbon ("HC"), to an oxidation catalyst on an upstream side of an exhaust passage by means of in-pipe injection or post-injection, and raising the exhaust gas temperature to a PM-burning temperature with heat produced upon oxidation.

For example, Patent Literature 1 discloses an exhaust gas purification device that performs a forced regeneration. This exhaust gas purification device estimates an amount of accumulated PM on the basis of the pressure difference across the DPF between the upstream side and the downstream side of the exhaust passage and a period of travelling of a vehicle (or a distance of travelling of the vehicle). When the amount of accumulated PM reaches or exceeds a predetermined value, the exhaust gas purification device performs the forced regeneration.

LISTING OF REFERENCES

PATENT LITERATURE 1: Japanese Patent No. 4070687

A flow rate of the exhaust gas flowing in the DPF changes with the running condition of the engine. Thus, a differential pressure sensor configured to detect a pressure difference across the DPF between the upstream side and the downstream side of the exhaust passage is not always able to estimate an accurate amount of accumulated PM. If the start control of the forced regeneration is carried out based on the vehicle travelling time (or vehicle travelling distance), the forced regeneration may be triggered even when the exhaust gas temperature is low. To avoid it, the low temperature exhaust gas should be heated to the PM burning temperature. This requires a large amount of fuel supply, and can deteriorate the fuel efficiency.

SUMMARY OF THE INVENTION

The present invention has been made in view of such problems, and an object of the present invention is to improve estimation accuracy of an estimated amount of accumulated PM and to optimize an amount of fuel supply during a forced regeneration.

To achieve the above-mentioned object, an exhaust gas purification device for an internal combustion engine according to the present invention includes a filter that is provided in an exhaust passage of the internal combustion engine and configured to collect particulate matter in an exhaust gas, an exhaust gas temperature detecting unit that is disposed on the exhaust passage upstream of the filter and configured to detect exhaust gas temperature, an electrostatic capacity detecting unit configured to detect an electrostatic capacity of the filter, an accumulation estimating unit configured to estimate an amount of accumulated particulate matter, which is collected by the filter, based on the detected electrostatic capacity, and a filter regenerating unit configured to supply fuel to the filter and perform a forced regeneration that raises a temperature of the filter to a particulate matter burning temperature. The filter regenerating unit is configured to perform the forced regeneration when the estimated amount of accumulated particulate matter has reached an accumulated-amount threshold and the detected exhaust gas temperature reaches a temperature threshold. The accumulated-amount threshold is a value that is smaller than an upper particulate matter accumulation limit. The temperature threshold corresponds to predetermined high exhaust gas temperature at which the accumulated particulate matter up to the accumulated-amount threshold can still be burned and removed even if an amount of fuel supply is reduced.

The exhaust gas purification device may further include a correcting unit for changing the temperature threshold to a lower value when the filter regenerating unit does not perform the forced regeneration over a predetermined period of time.

The electrostatic capacity detecting unit may include a pair of electrodes that are disposed in the filter so as to oppose each other with at least one partition wall interposed therebetween. The paired electrodes form a capacitor.

The exhaust gas purification device may further include a bypass passage that branches from the exhaust passage at a position upstream of the filter and connects to the exhaust passage at position downstream of the filter so as to bypass the filter, and a second filter that is provided in the bypass passage and collects particulate matter in the exhaust gas flowing through the bypass passage. The paired electrodes may be disposed in the second filter such that the two electrodes oppose each other with at least one partition wall interposed therebetween.

When a forced regeneration of the second filter is performed, the paired electrodes may be used as a heater.

The exhaust gas purification device for an internal combustion engine according to the present invention can improve the estimation accuracy of an amount of accumulated PM, and optimize the fuel supply during a forced regeneration.

DETAILED DESCRIPTION

Figure 1:
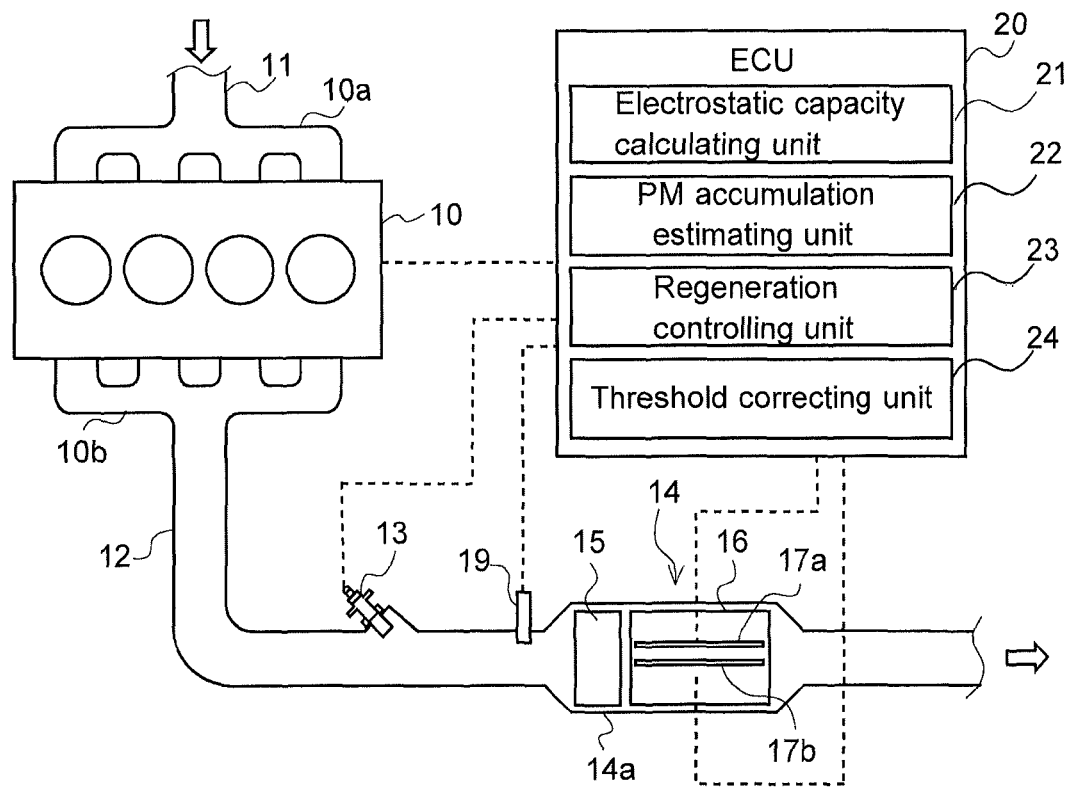
FIG. 1 is an overall configuration diagram schematically illustrating an exhaust gas purification device for an internal combustion engine according to an embodiment of the present invention.
Figure 2:
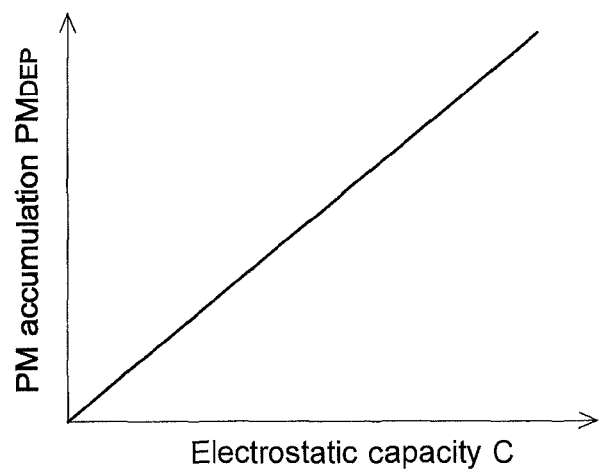
FIG. 2 is a map used to estimate an amount of accumulated PM from an electrostatic capacity in the exhaust gas purification device for the internal combustion engine according to the embodiment of the present invention.

With reference to FIGS. 1 to 4, an exhaust gas purification device for an internal combustion engine according to embodiments of the present invention will be described. Identical parts are given identical reference numerals and signs, and their names and functions are identical as well. Therefore, detailed description of such parts will not be repeated.

As illustrated in FIG. 1, a diesel engine (hereinafter, simply referred to as engine) 10 includes an intake manifold 10a and an exhaust manifold 10b. An intake passage 11 for introducing fresh air is connected to the intake manifold 10a, and an exhaust passage 12 for discharging exhaust gas to the atmosphere is connected to the exhaust manifold 10b. Furthermore, an in-pipe injection device 13, an exhaust gas temperature sensor 19, and an exhaust gas post-treatment device 14 are provided in the exhaust passage 12. The in-pipe injection device 13 is located upstream of the exhaust gas temperature sensor, and the exhaust gas temperature sensor is located upstream of the exhaust gas post-treatment device 14 in the exhaust passage.

The in-pipe injection device 13 injects unburned fuel (primarily HC) into the exhaust passage 12 in response to an instruction signal from an ECU 20. It should be noted that the in-pipe injection device 13 may be dispensed with if post-injection for carrying out multiple-injection to the engine 10 is used.

The exhaust gas temperature sensor 19 detects the temperature of the exhaust gas flowing in the exhaust passage 12 upstream of the exhaust gas post-treatment device 14. The exhaust gas temperature EGT detected by the exhaust gas temperature sensor 19 is introduced to an electronic control unit (hereinafter, referred to as ECU) 20. The exhaust gas temperature sensor 19 is electrically connected to the ECU 20.

The exhaust gas post-treatment device 14 includes an oxidation catalyst 15 and a DPF 16. The oxidation catalyst 15 is located upstream of the DPF 16 in the exhaust passage. The oxidation catalyst 15 and the DPF 16 are disposed in a casing 14a.

The oxidation catalyst 15 is formed, for example, of a catalyst component supported on a surface of a ceramic carrier. The ceramic carrier may have a cordierite honeycomb structure. As unburned fuel (primarily HC) is supplied by the in-pipe injection device 13 or through post-injection, the oxidation catalyst 15 oxidizes the unburned fuel, and raises the exhaust gas temperature.

The DPF 16 is an example of a filter according to the present invention, and has, for example, a number of cells defined by porous partition walls arranged in a flowing direction of the exhaust gas. The upstream side and the downstream side of these cells are alternately plugged. The DPF 16 collects PM of the exhaust gas in the small cavities of the partition walls and on the surfaces of the partition walls. Upon the amount of accumulated PM (PM accumulation) reaching a predetermined amount, a so-called forced regeneration for burning and removing the PM is executed. The forced regeneration is performed by supplying unburned fuel (primarily HC) to the oxidation catalyst 15 from the in-pipe injection device 13 or through post-injection and by raising the temperature of the DPF 16 to the PM-burning temperature (e.g., approximately 600 degrees C.).

The DPF 16 of this embodiment also has a pair of electrodes 17a and 17b that are disposed so as to oppose each other with at least one partition wall interposed therebetween. The electrodes 17a and 17b form a capacitor. The electrodes 17a and 17b are electrically connected to the ECU 20, respectively.

The ECU 20 controls fuel injection and other operations of the engine 10 and the in-pipe injection device 13, and includes known CPU, ROM, RAM, input port, output port, and other components. The ECU 20 also includes an electrostatic capacity calculating unit 21, a PM accumulation estimating unit 22, a regeneration controlling unit 23, and a threshold correcting unit 24 as part of its functional elements. The description continues with a premise that these functional elements are included in the ECU 20, which is an integrated hardware piece, but some of these functional elements can be provided in a separate hardware piece.

In this embodiment, the electrostatic capacity calculating unit 21 and the electrodes 17a and 17b constitute the electrostatic capacity detecting unit of the present invention. The regeneration controlling unit 23 and the in-pipe injection device 13 (or a fuel injection device (not shown) of the engine 10) constitute the filter regenerating unit of the present invention.

The electrostatic capacity calculating unit 21 calculates the electrostatic capacity C between the electrodes 17a and 17b on the basis of a signal entered from the electrodes 17a and 17b. The electrostatic capacity C is given by the following expression 1, where $\in$ represents the dielectric constant of a medium between the electrodes 17a and 17b, S represents the area of the electrodes 17a, 17b, and d represents the distance between the electrodes 17a and 17b.

$$C = \varepsilon \times \frac{S}{d} \qquad \text{Expression 1}$$

The PM accumulation estimating unit 22 calculates an amount of accumulated PM, i.e., $PM_{DEP}$, which is collected in the DPF 16, on the basis of the electrostatic capacity C calculated by the electrostatic capacity calculating unit 21. For example, when conductive carbon accumulates between the electrodes 17a and 17b, the distance d between the electrodes 17a and 17b substantially decreases, and the electrostatic capacity C increases. When the accumulation of PM in the medium between the electrodes 17a and 17b progresses, the dielectric constant $\in$ increases, and the electrostatic capacity C increases accordingly. In other words, a proportional relation is present between the electrostatic capacity C and the amount of accumulated PM (PM accumulation), and thus the amount of accumulated PM can easily be estimated by calculating the electrostatic capacity C. The ECU 20 stores a map (see FIG. 2) that shows the proportional relationship between the electrostatic capacity C and an amount of accumulated PM or PM accumulation $PM_{DEP}$. This relationship is prepared in advance by an experiment or the like. The PM accumulation estimating unit 22 reads the PM accumulation $PM_{DEP}$, which corresponds to the electrostatic capacity C calculated by the electrostatic capacity calculating unit 21, from the map.

The regeneration controlling unit 23 controls the forced regeneration of the DPF 16 on the basis of the exhaust gas temperature EGT entered from the exhaust gas temperature sensor 19, and the PM accumulation $PM_{DEP}$ estimated by the PM accumulation estimating unit 22. Specific contents of the control will be described with reference to FIGS. 3a and 3b.

Figure 3A:
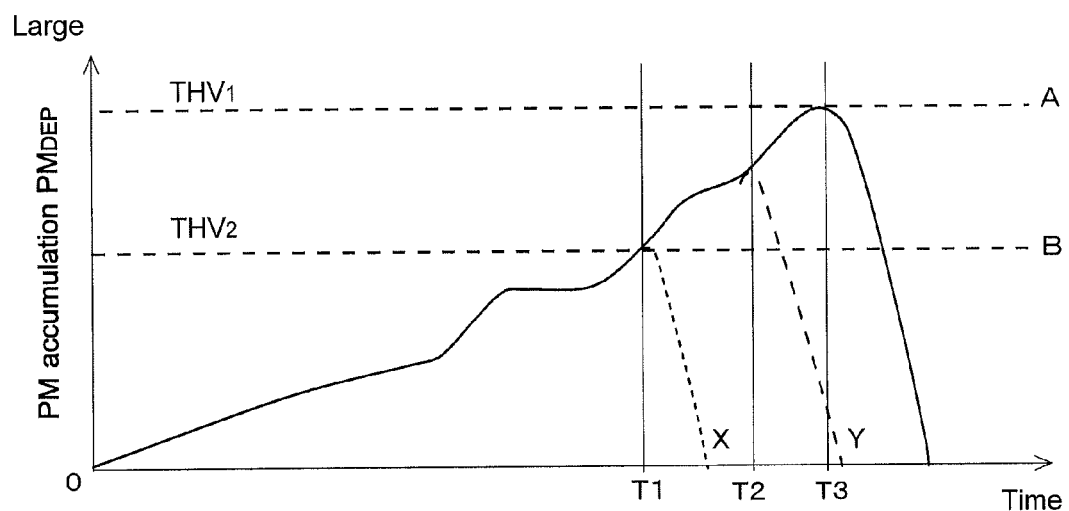
FIG. 3a illustrates a change in the amount of accumulated PM when the exhaust gas purification device for the internal combustion engine according to the embodiment of the present invention is used.
Figure 3B:
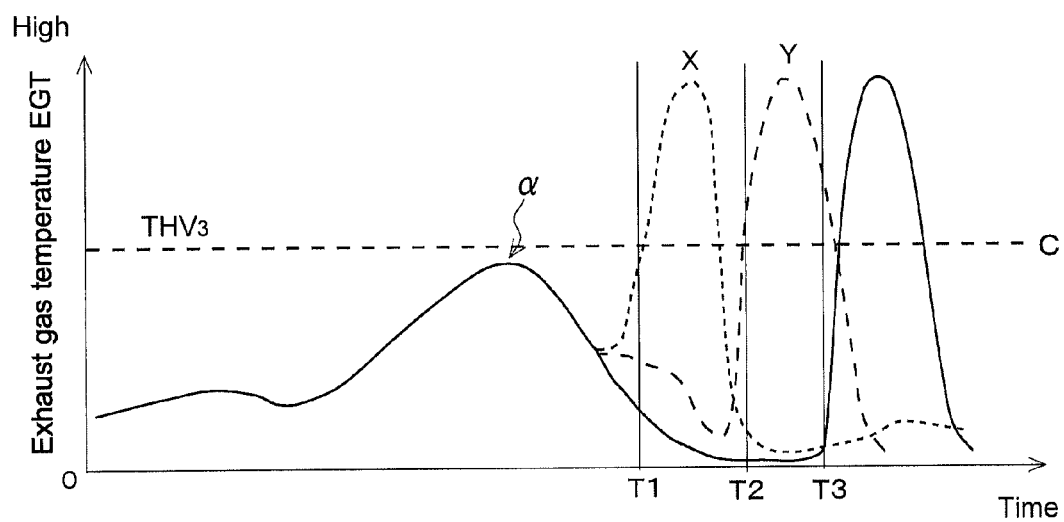
FIG. 3b shows a change in the exhaust gas temperature.

The ECU 20 stores in advance a first regeneration trigger threshold $THV_1$, which is indicated by the broken line A in FIG. 3a, a second regeneration trigger threshold $THV_2$, which is indicated by the broken line B in FIG. 3a (i.e., the accumulated-amount threshold of the invention), and an exhaust gas temperature threshold $THV_3$, which is indicated by the broken line C in FIG. 3b (i.e., the temperature threshold of the invention). The first regeneration trigger threshold $THV_1$ corresponds to an upper PM accumulation limit of the DPF 16. The second regeneration trigger threshold $THV_2$ corresponds to an amount of PM accumulation that can suppress the fuel supply when the forced regeneration is carried out while the vehicle is operating with the exhaust gas temperature EGT having a predetermined high value (e.g., approximately 400 degrees C.). The second regeneration trigger threshold $THV_2$ is smaller than the first regeneration trigger threshold $THV_1$. The exhaust gas temperature threshold $THV_3$ corresponds to high exhaust gas temperature (e.g., approximately 400 degrees C.) at which the accumulated PM up to the second regeneration trigger threshold $THV_2$ can still be burned and removed even if an amount of fuel supply is reduced during the forced regeneration.

The regeneration controlling unit 23 carries out the forced regeneration when the PM accumulation $PM_{DEP}$ reaches the first regeneration trigger threshold $THV_1$ ($PM_{DEP} \geq THY_1$) regardless of the exhaust gas temperature EGT (see time T3 in FIGS. 3a and 3b). The regeneration controlling unit 23 carries out the forced regeneration when the PM accumulation $PM_{DEP}$ reaches or exceeds the second regeneration trigger threshold $THV_2$ and is smaller than the first regeneration trigger threshold $THV_1$ ($THV_2 \leq PM_{DEP} < THV_1$), and the exhaust gas temperature EGT reaches or exceeds the exhaust gas temperature threshold $THV_3$ ($EGT \geq THV_3$) (see time T1 and T2 in FIG. 3b). On the other hand, even if the PM accumulation $PM_{DEP}$ reaches or exceeds the second regeneration trigger threshold $THV_2$ and is smaller than the first regeneration trigger threshold $THV_1$ ($THV_2 \leq PM_{DEP} < THV_1$), the regeneration controlling unit 23 refrains from carrying out the forced regeneration when the exhaust gas temperature EGT is smaller than the exhaust gas temperature threshold $THV_3$ (EGT<$THV_3$) (see the broken line Y between time T1 and T2 in FIG. 3b). In other words, when the exhaust gas temperature EGT is low, the forced regeneration is not carried out. After that, when the exhaust gas temperature EGT rises with the change in the vehicle operating condition, then the forced regeneration is carried out. In this manner, it is possible to effectively suppress the fuel supply during the forced regeneration.

The threshold correcting unit 24 changes the exhaust gas temperature threshold $THV_3$ on the basis of the time, over which the forced regeneration is not performed (hereinafter, referred to as no regeneration period $T_{NRE}$). In this embodiment, the no regeneration period $T_{NRE}$ is calculated by adding up the count of a timer from turning on of the ignition key (this includes finishing of the forced regeneration). The ECU 20 stores in advance the upper time limit $T_{MAX}$ that can accept the inexecution of the forced regeneration. When the no regeneration period $T_{NRE}$ exceeds the upper time limit $T_{MAX}$ ($T_{NRE} > T_{MAX}$), the threshold correcting unit 24 changes the exhaust gas temperature threshold $THVT_3$ to a lower value. As an exemplary way of changing the exhaust gas temperature threshold, it is preferred that the maximum value of the exhaust gas temperature EGT (see α or alpha in FIG. 3b) during the no regeneration period is stored beforehand, and the exhaust gas temperature threshold $THV_3$ is lowered to this maximum value.

Figure 4:
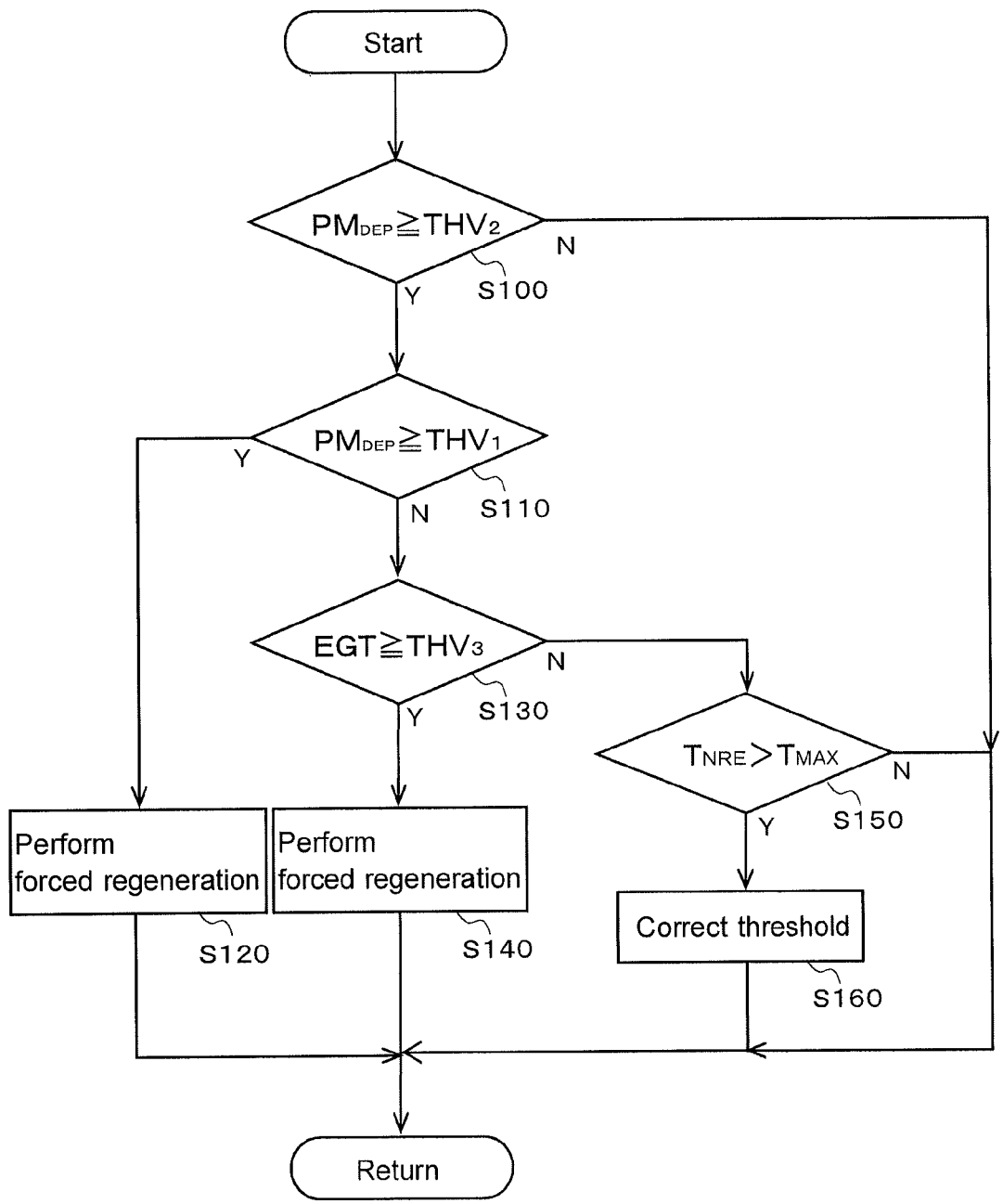
FIG. 4 is a flowchart illustrating the content of control by the exhaust gas purification device for the internal combustion engine according to the embodiment of the present invention.

Referring now to FIG. 4, a control process of the exhaust gas purification device according to the embodiment of the present embodiment will be described. This control starts upon turning on of an ignition key.

At step 100 (hereinafter, "step" is simply indicated as S), it is determined whether or not the PM accumulation $PM_{DEP}$, which is estimated from the electrostatic capacity C, reaches the second regeneration trigger threshold $THV_2$. If the PM accumulation $PM_{DEP}$ is equal to or greater than the second regeneration trigger threshold $THV_2$ (YES), then the control proceeds to S110. On the other hand, if the PM accumulation $PM_{DEP}$ is smaller than the second regeneration trigger threshold $THV_2$ (NO), the control proceeds to "Return."

At S110, it is determined whether the PM accumulation $PM_{DEP}$, which is estimated from the electrostatic capacity C, reaches the first regeneration trigger threshold $THV_1$. When the PM accumulation $PM_{DEP}$ is equal to or greater than the first regeneration trigger threshold $THV_1$ (YES), the control proceeds to S120, and the forced regeneration is performed regardless of the exhaust gas temperature EGT. Then, the control proceeds to "Return." On the other hand, when the PM accumulation $PM_{DEP}$ is smaller than the first regeneration trigger threshold $THV_1$ (NO), the control proceeds to S130.

At S130, it is determined whether the exhaust gas temperature EGT reaches the exhaust gas temperature threshold $THV_3$. If the exhaust gas temperature EGT is equal to or higher than the exhaust gas temperature threshold $THV_3$ (YES), the control proceeds to S140 to carry out the forced regeneration. Then, the control proceeds to "Return." On the other hand, if the exhaust gas temperature EGT is lower than the exhaust gas temperature threshold $THV_3$ (NO), the control proceeds to S150. In other words, the forced regeneration is refrained.

At S150, it is determined whether or not the no regeneration time $T_{NRE}$ exceeds the upper time limit $T_{MAX}$. If the no regeneration period $T_{NRE}$ exceeds the upper time limit $T_{MAX}$ (YES), the control proceeds to S160. On the other hand, if the no regeneration period $T_{NRE}$ is equal to or less than the upper time limit $T_{MAX}$ (NO), the control proceeds to "Return."

At S160, the correction is made such that the exhaust gas temperature threshold $THV_3$ is lowered to the maximum value of the exhaust gas temperature EGT, which is stored during S100-S150. Then, the control proceeds to "Return." After that, S100-S160 are reiterated until the ignition key is turned off.

Advantages of the exhaust gas purification device for the internal combustion engine according to this embodiment will be described.

In the conventional forced regeneration, the start control for the forced regeneration is performed on the basis of the DPF pressure difference and/or the vehicle travelling time. However, the flow rate of the exhaust gas changes with the vehicle or engine running condition, and therefore an amount of accumulated PM may not be accurately estimated from the DPF pressure difference. When the start control for the forced regeneration is performed on the basis of the vehicle traveling time (or the vehicle traveling distance), the forced regeneration may be carried out even if the exhaust gas temperature is low. This can increase the fuel supply and deteriorate the fuel efficiency.

On the contrary, the exhaust gas purification device of this embodiment estimates the PM accumulation $PM_{DEP}$ from the electrostatic capacity C between the two electrodes 17a and 17b disposed in the DPF 16. In addition, even if the estimated PM accumulation $PM_{DEP}$ reaches the second regeneration trigger threshold $THV_2$, the forced regeneration is not performed as long as the exhaust gas temperature EGT is low (below $THV_3$). The forced regeneration is performed when the exhaust gas temperature EGT becomes high (equal to or greater than $THV_3$), i.e., when the exhaust gas temperature EGT becomes a value that can suppress the fuel supply.

Therefore, the exhaust gas purification device of this embodiment can accurately estimate the PM accumulation $PM_{DEP}$ on the basis of the electrostatic capacity C, which is not influenced by changes in the vehicle or engine running condition. In addition, the exhaust gas purification device can effectively improve the fuel efficiency because the forced regeneration is refrained until the high exhaust gas temperature (equal to or greater than $THV_3$), which can suppress the fuel supply, is reached.

The exhaust gas purification device of this embodiment is configured to change the exhaust gas temperature threshold $THV_3$ to a lower value when the forced regeneration is not carried out over a predetermined period of time.

Accordingly, the exhaust gas purification device of this embodiment can reliably carry out the forced regeneration even if the engine is operated under a certain condition, i.e., even if the engine is not frequently operated under heavy load and the exhaust gas temperature EGT does not become high.

It is to be noted that the present invention is not limited to the above-described embodiment, and appropriate changes and modifications may be made to the above-described embodiment without departing from the scope and spirit of the present invention.

Figure 5:
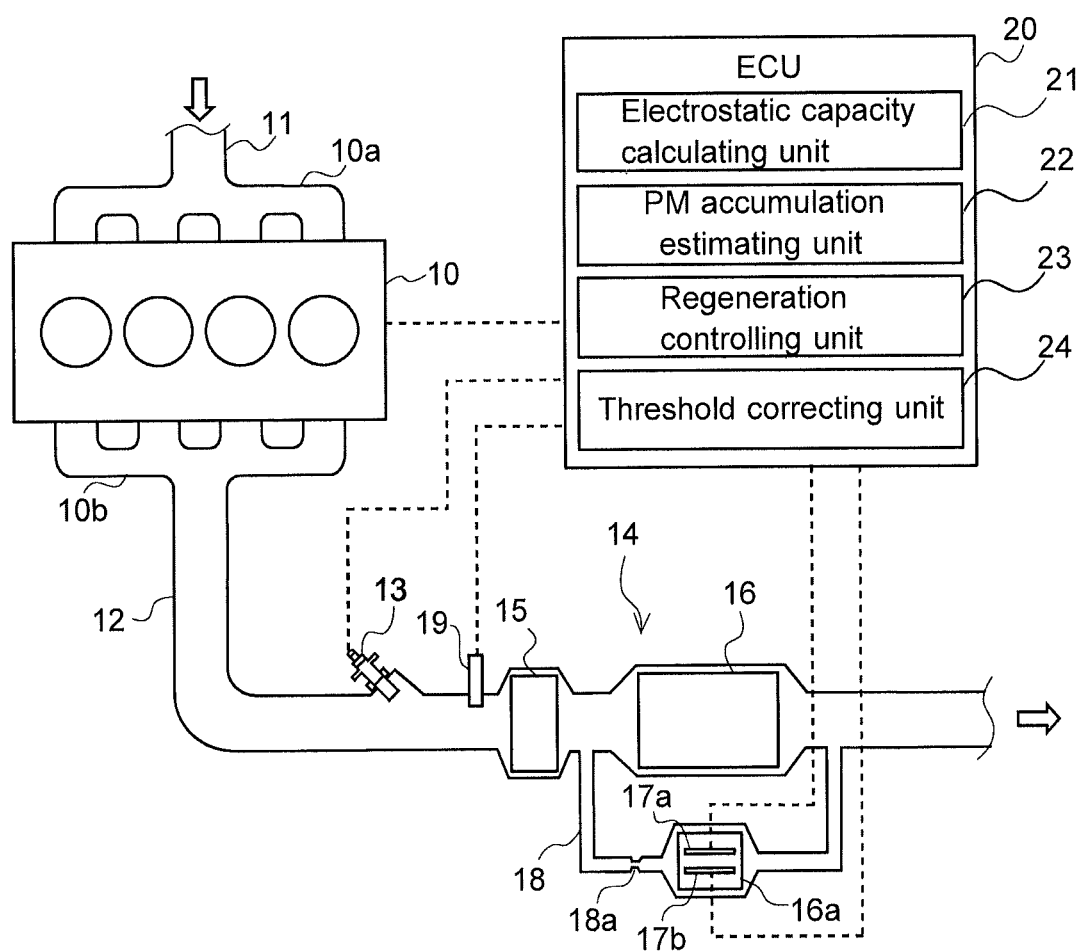
FIG. 5 is an overall configuration diagram schematically illustrating an exhaust gas purification device for an internal combustion engine according to another embodiment.

For example, as illustrated in FIG. 5, a bypass passage 18 may be connected to the exhaust passage 12 to bypass the DPF 16, and a DPF 16a for measurement (second filter) with a small capacity may be provided in the bypass passage 18. In this configuration, it is preferred that a pair of electrodes 17a and 17b are disposed in the measurement DPF 16a such that the electrodes 17a and 17b oppose each other with at least one partition wall interposed between the electrodes 17a and 17b, and an orifice (throttle) 18a is provided in the bypass passage 18 for regulating the flow rate of the exhaust gas. In addition, when a forced regeneration of the measurement DPF 16a is performed, an electric current may be applied to the electrodes 17a and 17b to cause the electrodes 17a and 17b to function as a heater.

What is claimed is:

1. An exhaust gas purification device for an internal combustion engine, comprising:
    a filter that is provided in an exhaust passage of the internal combustion engine and configured to collect particulate matter included in an exhaust gas;
    an exhaust gas temperature detector at the exhaust passage upstream of the filter and configured to detect exhaust gas temperature;
    an electrostatic capacity detector configured to detect an electrostatic capacity of the filter;
    a device to introduce a supply of fuel to the filter; and
    a processor configured to
        estimate an amount of accumulated particulate matter, which is collected by the filter, based on the detected electrostatic capacity, and
        control the fuel supply device to supply the fuel to the filter to perform a forced regeneration that raises a temperature of the filter to a particulate matter burning temperature,
    wherein the forced regeneration is performed when the estimated amount of accumulated particulate matter has reached an accumulated-amount threshold and the detected exhaust gas temperature reaches a temperature threshold,
    wherein the accumulated-amount threshold is a value smaller than an upper particulate matter accumulation limit, and the temperature threshold corresponds to a predetermined high exhaust gas temperature at which the accumulated particulate matter up to the accumulated-amount threshold can still be burned and removed even if an amount of the supply of fuel is reduced, and
    wherein the processor is further configured to change the temperature threshold to a lower value, when the processor does not perform the forced regeneration over a predetermined period of time.

2. The exhaust gas purification device for an internal combustion engine according to claim 1, wherein the electrostatic capacity detector includes a pair of electrodes disposed in the filter to oppose each other with at least one partition wall interposed between the pair of electrodes, said pair of electrodes forming a capacitor.

3. The exhaust gas purification device for an internal combustion engine according to claim 1, wherein the internal combustion engine is a diesel engine.

4. The exhaust gas purification device for an internal combustion engine according to claim 3, wherein the filter is a diesel particulate filter.

* * * * *